United States Patent
Donoue et al.

(10) Patent No.: US 8,501,354 B2
(45) Date of Patent: Aug. 6, 2013

(54) NON-AQUEOUS ELECTROLYTE SECONDARY BATTERY

(75) Inventors: Kazunori Donoue, Kobe (JP); Denis Yau Wai Yu, Kobe (JP); Takao Inoue, Kobe (JP); Masahisa Fujimoto, Osaka (JP); Hiroshi Kurokawa, Yawata (JP)

(73) Assignee: SANYO Electric Co., Ltd., Moriguchi-shi, Osaka (JP)

( * ) Notice: Subject to any disclaimer, the term of this patent is extended or adjusted under 35 U.S.C. 154(b) by 1691 days.

(21) Appl. No.: 11/702,519

(22) Filed: Feb. 6, 2007

(65) Prior Publication Data

US 2007/0184352 A1 Aug. 9, 2007

(30) Foreign Application Priority Data

Feb. 9, 2006 (JP) ................................. 2006-032352

(51) Int. Cl.
*H01M 6/16* (2006.01)
*H01M 4/13* (2010.01)
*H01M 4/58* (2010.01)

(52) U.S. Cl.
USPC ........................................ 429/338; 429/231.1

(58) Field of Classification Search
None
See application file for complete search history.

(56) References Cited

U.S. PATENT DOCUMENTS

| 5,626,981 | A | 5/1997 | Simon et al. | |
|---|---|---|---|---|
| 5,910,382 | A | 6/1999 | Goodenough et al. | |
| 7,101,521 | B2* | 9/2006 | Hosoya et al. | 423/306 |
| 2002/0034678 | A1* | 3/2002 | Shibuya et al. | 429/50 |
| 2002/0061274 | A1 | 5/2002 | Hosoya et al. | |
| 2002/0102459 | A1* | 8/2002 | Hosoya et al. | 429/221 |
| 2005/0019656 | A1 | 1/2005 | Yoon et al. | |
| 2005/0233220 | A1* | 10/2005 | Gozdz et al. | 429/231.95 |
| 2006/0292452 | A1 | 12/2006 | Utsugi et al. | |
| 2007/0154815 | A1 | 7/2007 | Kawasaki et al. | |
| 2008/0286655 | A1* | 11/2008 | Inoue et al. | 429/231.95 |
| 2012/0034517 | A1 | 2/2012 | Utsugi et al. | |

FOREIGN PATENT DOCUMENTS

| CN | 1346159 A | 4/2002 |
|---|---|---|
| EP | 1 193 786 A2 | 4/2002 |
| JP | 2001-325988 | 11/2001 |
| JP | 2002-110163 A | 4/2002 |
| JP | 2006-156315 A | 6/2006 |

(Continued)

OTHER PUBLICATIONS

K. Amine et al.; "High-temperature storage and cycling of C-LiFePO$_4$/graphite Li-ion cells"; Electrochemistry Communications 7 (2005) 669-673, electronically published on May 23, 2005.

(Continued)

*Primary Examiner* — Emily Le
*Assistant Examiner* — Michael Forrest
(74) *Attorney, Agent, or Firm* — Westerman, Hattori, Daniels & Adrian, LLP

(57) ABSTRACT

Using a non-aqueous electrolyte secondary battery containing lithium iron phosphate as a positive electrode active material and graphite as a negative electrode active material, a low-cost, high energy density battery is provided that exhibits good performance at high rate current and good cycle performance even at high temperature. The non-aqueous electrolyte secondary battery has a positive electrode having a positive electrode current collector and a positive electrode active material-containing layer formed on a surface of the positive electrode current collector, the positive electrode active material-containing layer containing a conductive agent and a positive electrode active material including lithium iron phosphate, a negative electrode containing a carbon material, and a non-aqueous electrolyte. The non-aqueous electrolyte contains vinylene carbonate.

5 Claims, 2 Drawing Sheets

FOREIGN PATENT DOCUMENTS

| | | |
|---|---|---|
| WO | WO 2005/086260 A1 | 9/2005 |
| WO | WO 2007/030816 A2 | 3/2007 |

OTHER PUBLICATIONS

D. Aurbach et al., "On the use of vinylene carbonate (VC) as an additive to electrolyte solutions for Li-ion batteries"; Electrochimica Acta 47 (2002) 1423-1439.

Hung-Chun Wu et al., "Enhanced High-Temperature Cycle Life of $LiFePO_4$-Based Li-Ion Batteries by Vinylene Carbonate as Electrolyte Additive", Electrochemical and Solid-State Letters, vol. 9, No. 12, pp. A537-A541, Sep. 19, 2006.

Japanese Office Action dated Oct. 24, 2012, issued in corresponding Japanese Patent Application No. 2006-032352, (2 pages).

* cited by examiner

NON-AQUEOUS ELECTROLYTE SECONDARY BATTERY

BACKGROUND OF THE INVENTION

1. Field of the Invention

The present invention relates to a non-aqueous electrolytic secondary battery comprising a non-aqueous electrolyte, a negative electrode that contains a carbon material, and a positive electrode that has a positive electrode current collector and a positive electrode active material-containing layer formed on a surface of the positive electrode current collector, the positive electrode active material-containing layer comprising a positive electrode active material containing lithium iron phosphate and a conductive agent.

2. Description of Related Art

Rapid advancements in size and weight reductions of mobile information terminal devices such as mobile telephones, notebook computers, and PDAs in recent years have created demands for higher capacity batteries as driving power sources for the devices. Non-aqueous electrolyte secondary batteries, such as represented by lithium-ion secondary batteries, use a non-aqueous electrolyte, and perform charge and discharge operations by transmitting lithium ions between the positive and negative electrodes. With their high energy density and high capacity, non-aqueous electrolyte secondary batteries have been widely used as the driving power sources for the mobile information terminal devices.

The non-aqueous electrolyte secondary batteries generally used have a positive electrode composed of $LiCoO_2$, a negative electrode composed of metallic lithium, a lithium alloy, or a carbon material that is capable of intercalating and deintercalating lithium, and a non-aqueous electrolyte in which an electrolyte composed of lithium salt such as $LiBF_4$ or $LiPF_6$ is dissolved in an organic solvent such as ethylene carbonate or diethyl carbonate.

The use of Co, however, leads to high manufacturing costs because Co is an exhaustible and scarce natural resource. Moreover, the battery employing $LiCoO_2$ has the problem of poor thermal stability when the battery in a charged stage undergoes an unexpectedly high temperature that would not reach in normal use.

For these reasons, utilization of $LiMn_2O_4$ and $LiNiO_2$ as an alternative positive electrode material to $LiCoO_2$ has been researched. However, the use of $LiMn_2O_4$ is not expected to achieve sufficient discharge capacity, and moreover, has such a problem as dissolution of manganese at a high battery temperature. Likewise, the use of $LiNiO_2$ may cause problems such as low discharge voltage.

In view of these problems, olivine-type lithium phosphates such as $LiFePO_4$ have attracted attention in recent years as alternative positive electrode materials to $LiCoO_2$.

The olivine-type lithium phosphates are lithium composite compounds represented by the general formula $LiMPO_4$ (where M is at least one element selected from the group consisting of Co, Ni, Mn, and Fe), and result in varied working voltages depending on the type of the metal element M. This leads to the advantage that the battery voltage can be freely selected by selecting the element M. Moreover, a large battery capacity per unit mass is achieved because the theoretical capacity is relatively high, from about 140 mAh/g to 170 mAh/g. Furthermore, for the element M, it is possible to use iron, which is readily available and low in cost, so the manufacturing cost of batteries can significantly reduce. Thus, the olivine-type phosphates are suitable as the positive electrode materials for large-sized batteries and high-power batteries.

Nevertheless, problems have still remained unsolved with the use of lithium iron phosphate as a positive electrode active material for non-aqueous electrolyte secondary batteries. Amine et al. report that when a battery comprising $LiFePO_4$ as the positive electrode active material, graphite as the negative electrode, and an electrolyte in which $LiPF_6$ is dissolved in a mixed solvent of ethylene carbonate (EC) and diethyl carbonate (DEC) is subjected to a cycle test at 55° C., dissolution of the iron from the positive electrode active material occurs, considerably degrading the capacity (see K. Amine et al. Electrochemistry Communications 7 (2005) pp. 669-673.). Such considerable capacity degradation at high temperature is a serious problem in large-sized batteries and high-power batteries, which are usually charged and discharged at a large current and are therefore likely to undergo a high battery temperature.

In order to solve the problem, Amine et al. have reported in the publication that the cycle performance at 55° C. improves by the use of an electrolytic salt $LiB(C_2O_4)_2$ [lithium bis-(oxalato)borate] in place of $LiPF_6$.

The just-mentioned $LiB(C_2O_4)_2$ is, however, difficult to synthesize, and the use of $LiB(C_2O_4)_2$ as an electrolytic salt is likely to increase the manufacturing cost of the battery. In addition, with lithium iron phosphate, the intercalation and deintercalation reactions during charge and discharge of the battery are slow, and in addition, the electron conductivity is much lower than those of lithium cobalt oxide, lithium nickel oxide, lithium manganese oxide, and the like. For this reason, in the battery using lithium iron phosphate, resistance overvoltage and activation overvoltage increase particularly during high-rate discharge, which significantly degrades battery performance. In order to resolve this problem, it has been proposed to use a positive electrode current collector having a mean surface roughness Ra of greater than 0.026, to control the BET specific surface area of the conductive agent to be 15 $m^2/g$, and to control the filling density of the positive electrode active material-containing layer to be 1.7 $g/cm^3$ or greater (see WO2005/086260).

Although the above-described technique can improve high-rate discharge characteristics, it has the problem of poor cycle performance at high temperature.

BRIEF SUMMARY OF THE INVENTION

Accordingly, it is an object of the present invention to provide a low cost, high energy density non-aqueous electrolyte secondary battery employing lithium iron phosphate as a positive electrode active material and graphite as a negative electrode active material at low cost, the battery exhibiting good performance at high rate current and good cycle performance even at high temperature.

In order to accomplish the foregoing and other objects, the present invention provides a non-aqueous electrolyte secondary battery comprising: a positive electrode having a positive electrode current collector and a positive electrode active material-containing layer formed on a surface of the positive electrode current collector, the positive electrode active material-containing layer containing a conductive agent and a positive electrode active material including lithium iron phosphate; a negative electrode containing a carbon material; and a non-aqueous electrolyte containing vinylene carbonate and/or a derivative thereof.

According to the present invention, a low cost, high energy density non-aqueous electrolyte secondary battery can be

DETAILED DESCRIPTION OF THE INVENTION

Figure 1:
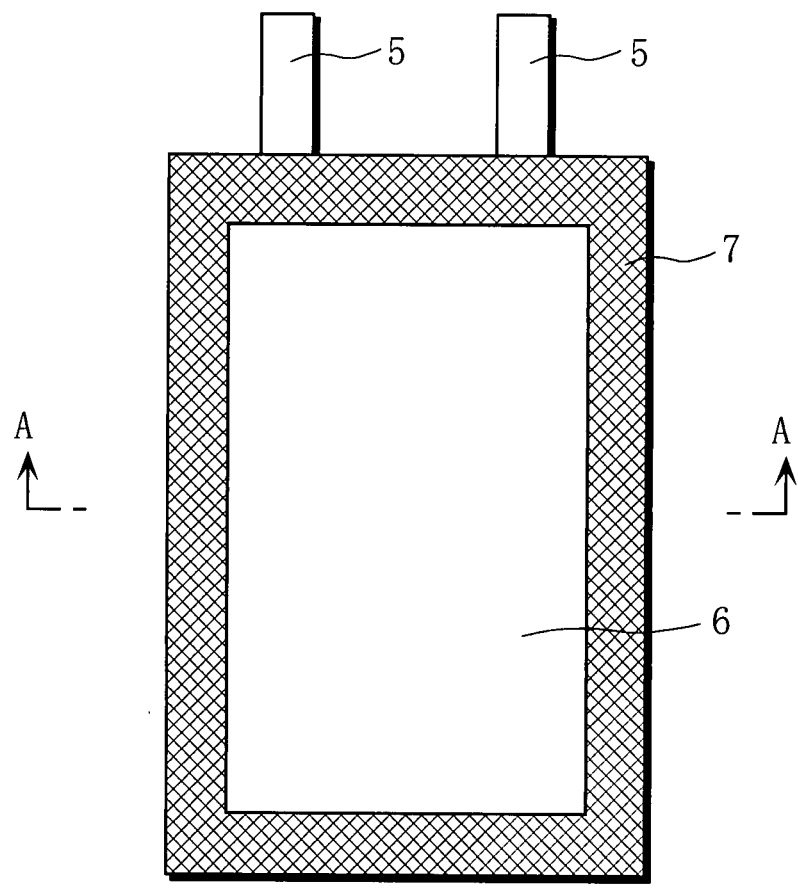
FIG. 1 is a front view of a battery according to one embodiment of the present invention.

The present invention provides a non-aqueous electrolyte secondary battery comprising a positive electrode, a negative electrode, and a non-aqueous electrolyte. The positive electrode has a positive electrode current collector and a positive electrode active material-containing layer formed on a surface of the positive electrode current collector. The positive electrode active material-containing layer contains a conductive agent and a positive electrode active material including lithium iron phosphate. The negative electrode containing a carbon material, and the non-aqueous electrolyte containing vinylene carbonate and/or a derivative thereof.

Generally, it has been known that vinylene carbonate (hereinafter also abbreviated as VC) reacts at the surface of the negative electrode made of graphite and forms a good SEI (solid-electrolyte interface) surface film on the negative electrode surface, whereby it shows the effect of improving the negative electrode significantly when the charge-discharge cycle is repeated, especially when the charge-discharge cycle is repeated at high temperature, but it does not exhibit the effect of improving the positive electrode when the charge-discharge cycle is repeated. Aurbach et al. reports that when the positive electrode active material is lithium manganese oxide ($LiMn_2O_4$) or lithium nickel oxide ($LiNiO_2$) and the negative electrode active material is graphite, VC reacts both at the positive electrode surface and the negative electrode surface and serves to prevent an increase in impedance, but does not improve the cycle performance of the positive electrode [see Aurbach D. et al. *Electrochimica* Acta 47 (2002) p. 1423].

When lithium iron phosphate ($LiFePO_4$) is used as the positive electrode active material, not the lithium manganese oxide and so forth, the iron in the lithium iron phosphate dissolves into the electrolyte solution and the dissolved iron ions deposit on the negative electrode. The deposited iron reduces the negative electrode capacity and consequently reduces the battery capacity.

As in the foregoing configuration, when the non-aqueous electrolyte contains VC and/or a derivative thereof, VC reacts with the lithium iron phosphate at the positive electrode surface and forms a good surface film on the surface of the lithium iron phosphate. This prevents the iron from dissolving into the electrolyte solution. Accordingly, it is possible to prevent iron ions from depositing on the negative electrode, lessening the capacity decrease in the negative electrode. As a result, the cycle performance of the battery, particularly the high-temperature cycle performance improves dramatically.

In addition, since VC is relatively easier to synthesize than $LiB(C_2O_4)_2$, the manufacturing cost of the battery can be kept low. Moreover, the use of lithium iron phosphate as a positive electrode active material makes it possible to achieve a high energy density battery. Furthermore, since VC reacts at both the positive electrode surface and the negative electrode surface and inhibits an increase in impedance, the battery performance at high rate current can be improved.

It is desirable that the content of the vinylene carbonate and/or a derivative thereof in the non-aqueous electrolyte be 4 mg or greater per 1 g of the lithium iron phosphate.

The reason for this restriction is that if the amount of VC added is less than 4 mg per 1 g of the lithium iron phosphate, the positive electrode active material surface cannot be coated with a good surface film since the amount of added is too small, so the high-temperature cycle performance may not be improved sufficiently.

In addition, it is desirable that the content of the vinylene carbonate and/or a derivative thereof in the non-aqueous electrolyte be 40 mg or less per 1 g of the lithium iron phosphate.

The reason for this restriction is that when the amount of VC added is larger than 40 mg per 1 g of the lithium iron phosphate, the surface films that cover the positive and negative electrodes become too thick and the resistance accordingly increases, and therefore, the load characteristics of the battery degrade, although the high-temperature cycle performance may improve.

Moreover, it is desirable that the positive electrode active material-containing layer have a filling density of from 1.7 $g/cm^3$ to 3.15 $g/cm^3$, more preferably from 1.7 $g/cm^3$ to 2.7 $g/cm^3$, and still more preferably from 2.0 $g/cm^3$ to 2.3 $g/cm^3$.

If the filling density in the positive electrode active material-containing layer less than 1.7 $g/cm^3$, the energy density of the positive electrode becomes poor and the adhesion of the positive electrode active material to the conductive agent and to the positive electrode current collector also becomes poor, causing the electron conductivity within the positive electrode to be insufficient and consequently reducing the discharge performance during high-rate discharge. On the other hand, if the filling density in the positive electrode active material-containing layer exceeds 3.15 $g/cm^3$, the positive electrode will have too narrow a space for accommodating the electrolyte solution, so the amount of the electrolyte solution impregnated in the electrode will be too small, lowering the discharge capacity of the battery.

In addition, it is desirable that the lithium iron phosphate be superficially coated with carbon, and the amount of the carbon be from 0.5 mass % to 5 mass % with respect to the amount of the lithium iron phosphate.

The lithium iron phosphate should superficially be coated with carbon for the following reason. A problem with lithium iron phosphate is that the battery using lithium iron phosphate tends to show poor performance at high rate current because lithium iron phosphate has a low electron conductivity and therefore results in a low diffusion rate of lithium in solid substances. In view of this problem, the surface of the lithium iron phosphate is coated with carbon to prevent the lowering of the electron conductivity due to lithium iron phosphate, so that the performance at high rate current can be improved dramatically.

It may appear possible to add a conductive agent made of carbon to the positive electrode material when preparing the positive electrode, but this only serves to form conductive paths from the surface of the positive electrode active material particle and does not ensure conductive paths within the positive electrode active material particle. Therefore, this technique does not considerably improve the utilization factor of the positive electrode active material nor achieve a dramatic improvement in the performance at high rate current.

The amount of carbon with respect to lithium iron phosphate (hereinafter also referred to as "carbon-coating amount") should be controlled to be 0.5 mass % or greater because, if the carbon-coating amount is less than 0.5 mass %, the coating amount is too small to sufficiently compensate the low electron conductivity of the lithium iron phosphate. On the other hand, the carbon-coating amount should be controlled to be 5 mass % or less because, if the carbon-coating amount is greater than 5 mass %, the filling density of the positive electrode active material in the positive electrode is so low that the energy density of the battery becomes poor.

Furthermore, it is desirable that the lithium iron phosphate has a median particle diameter (d50) of 3.5 μm or less, as determined by a laser diffraction particle size analyzer.

The median particle diameter of the lithium iron phosphate should be controlled to be 3.5 μm or less because, although lithium iron phosphate results in a low diffusion rate of lithium in solid substances as mentioned above, reducing the median particle diameter of lithium iron phosphate makes it possible to shorten the distance of lithium diffusion in the solid substance, and therefore can compensate the low diffusion rate of lithium. From this viewpoint, it is preferable that the median particle diameter of the lithium iron phosphate be as small as possible, particularly preferably 0.9 μm or less.

Furthermore, it is desirable that the lithium iron phosphate have a BET specific surface area of 10 $m^2/g$ or greater.

When the lithium iron phosphate has a large BET specific surface area, the reaction area accordingly increases, which can compensate the low diffusion rate of lithium in solid substances.

It is desirable that the conductive agent have a BET specific surface area of 15 $m^2/g$ or greater.

If the conductive agent has a BET specific surface area of less than 15 $m^2/g$, the particle size of the conductive agent is so large that a sufficient amount of conductive agent cannot be dispersed over the surface of the positive electrode active material, lithium iron phosphate, and therefore, the contact area between the lithium iron phosphate surface and the conductive agent reduces, degrading the electron conductivity within the electrode.

EXAMPLES

Figure 2:
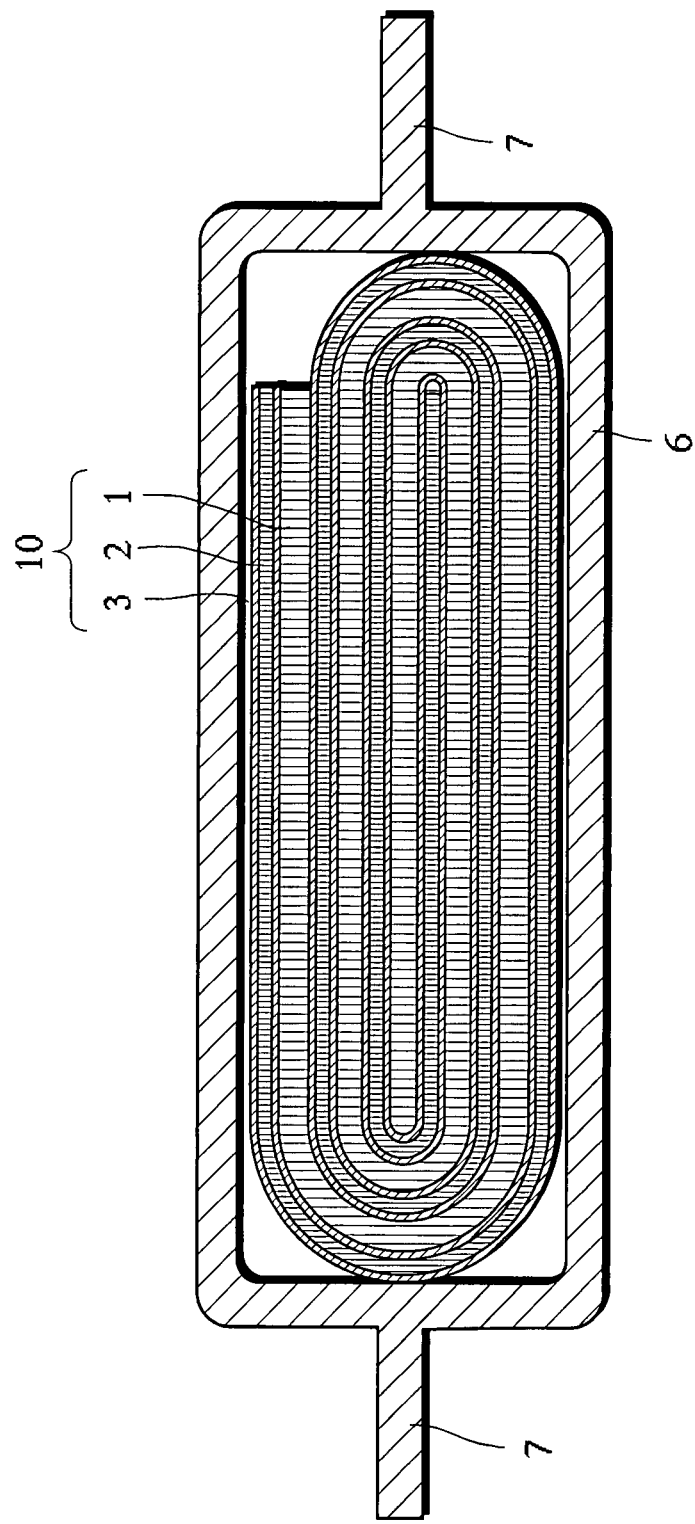
FIG. 2 is a cross-sectional view taken along line A-A in FIG. 1.

Hereinbelow, embodiments of the non-aqueous electrolyte secondary battery according to the invention are described with reference to FIGS. 1 and 2. It should be construed, however, that the present invention is not limited to the following examples but various changes and modifications are possible without departing from the scope of the invention.

Preparation of Positive Electrode

First, a positive electrode active material, and acetylene black, serving as a conductive agent (BET specific surface area: 39 $m^2/g$), were added into a solution in which polyvinylidene fluoride as a binder is dissolved in N-methyl-2-pyrrolidone as a dispersion medium, so that the mass ratio of the positive electrode active material, the conductive agent, and the binder was 90:5:5. Then, the mixture was kneaded to produce a positive electrode slurry. Next, the resultant positive electrode slurry is applied onto an aluminum foil serving as a positive electrode current collector, and then dried. Thereafter, the resultant material was pressure-rolled using pressure rollers, and then a current collector tab was attached thereto. Thus, a positive electrode was prepared, in which a positive electrode active material-containing layer was formed on the positive electrode current collector. The lithium iron phosphate had a BET specific surface area of 16 $m^2/g$ and a median particle diameter of 0.84 μm. The lithium iron phosphate was superficially coated with carbon, and the amount of carbon with respect to the amount of the lithium iron phosphate (hereinafter may be abbreviated as "carbon-coating amount") was 2.2 mass %. The amount of the positive electrode active material ($LiFePO_4$) contained in the prepared positive electrode was 4 g. The positive electrode active material-containing layer had a filling density of 2.0 $g/cm^3$ after the pressure-rolling.

Preparation of Negative Electrode

First, artificial graphite as a negative electrode active material and styrene-butadiene rubber as a binder were added to an aqueous solution in which carboxymethylcellulose as a thickening agent was dissolved in water so that the mass ratio of the negative electrode active material, the binder, and the thickening agent was 95:3:2. The resultant mixture was then kneaded to produce a negative electrode slurry. Next, the resultant negative electrode slurry was applied onto a copper foil serving as a negative electrode current collector, and then dried. The resultant material was then pressure-rolled using pressure-rollers, and a current collector tab was attached thereto. Thus, a negative electrode was prepared.

Preparation of Electrolyte Solution $LiPF_6$ was dissolved in a mixed solvent of 3:7 volume ratio of ethylene carbonate (EC) and ethyl methyl carbonate (EMC) at a concentration 1 mole/liter, and further, vinylene carbonate (VC) was added in the amount of 2.0 mass % with respect to the total mass of the electrolyte solution, to thus prepare 3.2 g of electrolyte solution.

Preparation of Battery

First, the positive electrode and the negative electrode prepared in the above-described manner were overlapped facing each other across the separator interposed therebetween. Thereafter, they were wound up and pressed into a flat shape, to thus prepare an electrode assembly. The electrode assembly was dried in vacuum at 105° C. for 20 hours. Next, in a glove box under an argon atmosphere, the electrode assembly was inserted into a battery case made of 0.11 mm-thick aluminum laminate, and 3.2 g of the electrolyte solution was filled therein, followed by sealing the battery case. Thus, a battery was produced.

Here, in the just-described battery, the mass of the electrolyte solution is 3.2 g and the amount of VC in the electrolyte solution is 2.0 mass %, as mentioned above; therefore, the absolute amount of VC can be found by the following equation (1).

$$3.2 \times 2.0 \times 0.01 \times 1000 = 64 \text{ (mg)} \quad (1)$$

As described above, the mass of the positive electrode active material is 4 g; therefore, the amount of VC added per 1 g of the positive electrode active material can be found by the following equation (2).

$$64/4 = 16 \text{ (mg)} \quad (2)$$

The specific structure of the lithium secondary battery is as follows. As illustrated in FIGS. 1 and 2, the flat and wound electrode assembly 10, which comprises the positive electrode 1, the negative electrode 2, and the separator 3, is disposed inside the space of the aluminum laminate battery case 6 provided with a sealed part 7 at which opposing peripheral ends of the aluminum laminate are heat sealed. A positive electrode current collector tab 4 and a negative electrode current collector tab 5 are disposed protruding outwardly, thus forming a structure capable of charging and discharging as a secondary battery. The battery has dimensions of 4.0 mm thickness×35 mm width×62 mm length.

First Embodiment

Example A1

A battery fabricated in the same manner as described in the foregoing embodiment was used as a battery of Example 1.

The battery thus fabricated is hereinafter referred to as Battery A1 of the invention.

Example A2

A battery was fabricated in the same manner as described in Example 1 above, except that the amount of VC in the electrolyte solution was 0.2 mass %.

The battery thus fabricated is hereinafter referred to as Battery A2 of the invention.

In Battery A2 of the invention, the mass of the electrolyte solution is 3.2 g, and the amount of VC in the electrolyte solution is 0.2 mass %. Therefore, the absolute amount of VC can be found by the following equation (3).

$$3.2 \times 0.2 \times 0.01 \times 1000 = 6.4 \text{ (mg)} \quad (3)$$

As described above, the mass of the positive electrode active material is 4 g. Therefore, the amount of VC added per 1 g of the positive electrode active material can be found by the following equation (4).

$$6.4/4 = 1.6 \text{ (mg)} \quad (4)$$

Example A3

A battery was fabricated in the same manner as described in Example 1 above, except that the amount of VC in the electrolyte solution was 0.5 mass %.

The battery thus fabricated is hereinafter referred to as Battery A3 of the invention.

In Battery A3 of the invention, the mass of the electrolyte solution is 3.2 g, and the amount of VC in the electrolyte solution is 0.5 mass %. Therefore, the absolute amount of VC can be found by the following equation (5).

$$3.2 \times 0.5 \times 0.01 \times 1000 = 16 \text{ (mg)} \quad (5)$$

As described above, the mass of the positive electrode active material is 4 g. Therefore, the amount of VC added per 1 g of the positive electrode active material can be found by the following equation (6).

$$16/4 = 4 \text{ (mg)} \quad (6)$$

Example A4

A battery was fabricated in the same manner as described in Example 1 above, except that the amount of VC in the electrolyte solution was 1.0 mass %.

The battery thus fabricated is hereinafter referred to as Battery A4 of the invention.

In Battery A4 of the invention, the mass of the electrolyte solution is 3.2 g, and the amount of VC in the electrolyte solution is 1.0 mass %. Therefore, the absolute amount of VC can be found by the following equation (7).

$$3.2 \times 1.0 \times 0.01 \times 1000 = 32 \text{ (mg)} \quad (7)$$

As described above, the mass of the positive electrode active material is 4 g. Therefore, the amount of VC added per 1 g of the positive electrode active material can be found by the following equation (8).

$$32/4 = 8 \text{ (mg)} \quad (8)$$

Example A5

A battery was fabricated in the same manner as described in Example 1 above, except that the amount of VC in the electrolyte solution was 5.0 mass %.

The battery thus fabricated is hereinafter referred to as Battery A5 of the invention.

In Battery A5 of the invention, the mass of the electrolyte solution is 3.2 g, and the amount of VC in the electrolyte solution is 5.0 mass %. Therefore, the absolute amount of VC can be found by the following equation (9).

$$3.2 \times 5.0 \times 0.01 \times 1000 = 160 \text{ (mg)} \quad (9)$$

As described above, the mass of the positive electrode active material is 4 g. Therefore, the amount of VC added per 1 g of the positive electrode active material can be found by the following equation (10).

$$160/4 = 40 \text{ (mg)} \quad (10)$$

Example A6

A battery was fabricated in the same manner as described in Example 1 above, except that the amount of VC in the electrolyte solution was 7.0 mass %.

The battery thus fabricated is hereinafter referred to as Battery A6 of the invention.

In Battery A6 of the invention, the mass of the electrolyte solution is 3.2 g, and the amount of VC in the electrolyte solution is 7.0 mass %. Therefore, the absolute amount of VC can be found by the following equation (11).

$$3.2 \times 7.0 \times 0.01 \times 1000 = 224 \text{ (mg)} \quad (11)$$

As described above, the mass of the positive electrode active material is 4 g. Therefore, the amount of VC added per 1 g of the positive electrode active material can be found by the following equation (12).

$$224/4 = 56 \text{ (mg)} \quad (12)$$

Example A7

A battery was fabricated in the same manner as described in Example 1 above, except that the amount of VC in the electrolyte solution was 10.0 mass %.

The battery thus fabricated is hereinafter referred to as Battery A7 of the invention.

In Battery A7 of the invention, the mass of the electrolyte solution is 3.2 g, and the amount of VC in the electrolyte solution is 10.0 mass %. Therefore, the absolute amount of VC can be found by the following equation (13).

$$3.2 \times 10.0 \times 0.01 \times 1000 = 320 \text{ (mg)} \quad (13)$$

As described above, the mass of the positive electrode active material is 4 g. Therefore, the amount of VC added per 1 g of the positive electrode active material can be found by the following equation (14).

$$320/4 = 80 \text{ (mg)} \quad (14)$$

Comparative Example Z

A non-aqueous electrolyte secondary battery was fabricated in the same manner as described in Example 1, except that no VC was added to the electrolyte solution.

The battery thus fabricated is hereinafter referred to as Comparative Battery Z.

Experiment

The above-described Batteries A1 to A7 of the invention and Comparative Battery Z were cycled under the charge-discharge conditions set forth below to find the high-temperature cycle performance of each battery. The results are shown in Table 1 below. The evaluation items in the high-temperature cycle performance test were capacity retention ratio after the 50th cycle, average charge-discharge efficiency during cycling, and amount of Fe contained in the negative electrode active material per 1 g of the negative electrode active material after the 50th cycle. The methods of calculating the evaluation items and the methods of the measurements are also described below.

Charge-Discharge Conditions

Charge Conditions

Each of the batteries was charged at 55° C. with a constant current of 600 mA to a battery voltage of 4.0 V.

Discharge Conditions

Each of the batteries was discharged at 55° C. with a constant current of 600 mA to a battery voltage of 4.0 V.

The charge-discharge capacity of each of the batteries was measured during the discharge.

Method of Calculating Capacity Retention Ratio after the 50th Cycle

The batteries were charged and discharged under the following conditions to measure the capacity retention ratios after the 50th cycle. The capacity retention ratios after the 50th cycle were calculated using the following equation (15).

Capacity retention ratio after the 50th cycle (%)=(Discharge capacity at the 50th cycle/Discharge capacity at the 1st cycle)×100 (15)

Method of Calculating Average Charge-Discharge Efficiency During Cycling

Charge-discharge efficiency $E_n$ at the n-th cycle was calculated using the following equation (16).

$E_n$=(Discharge capacity at the $n$-th cycle/Charge capacity at the $n$-th cycle)×100 (16)

Thereafter, the average value in the 1st to 50th cycles (average charge-discharge efficiency) E was calculated using the following equation (17).

$E=(E_1+E_2+E_3 \ldots +E_{49}+E_{50})/50$ (17)

Measurement Method of Amount of Fe Contained Per 1 g of the Negative Electrode Active Material-Containing Layer after the 50th Cycle Each of the batteries subjected to the above-described high-temperature cycle performance test was disassembled after the 50th cycle, and the negative electrode active material-containing layer was peeled off from negative electrode current collector. Then, the amount of Fe that was present in the negative electrode active material-containing layer was determined using ICP emission spectroscopy.

TABLE 1

| Battery | Carbon-coating amount of positive electrode active material (mass %) | BET specific surface area of positive electrode active material (m²/g) | Median particle diameter of positive electrode active material (μm) | Filling density of positive electrode active material-containing layer (g/cm³) | Amount of VC in electrolyte solution (per 1 g of positive electrode active material) (mg) | Capacity retention ratio after the 50th cycle (%) | Average charge-discharge efficiency during cycling (%) | Amount of Fe contained per 1 g of negative electrode active material-containing layer at the 50th cycle (μm) |
|---|---|---|---|---|---|---|---|---|
| A2 | 2.2 | 16 | 0.84 | 2.0 | 1.6 | 58.8 | 98.63 | Not measured |
| A3 | | | | | 4 | 79.4 | 99.26 | 653 |
| A4 | | | | | 8 | 86.3 | 99.53 | 253 |
| A1 | | | | | 16 | 95.7 | 99.82 | 30.8 |
| A5 | | | | | 40 | 94.3 | 99.87 | 9.2 |
| A6 | | | | | 56 | 90.0 | 99.78 | Not measured |
| A7 | | | | | 80 | 90.0 | 99.58 | Not measured |
| Z | | | | | 0 | 43.4 | 98.07 | 1050 |

As clearly seen from Table 1, Batteries A1-A7 of the invention, which contained VC, exhibited higher capacity retention ratios after the 50th cycle (charge-discharge at 55° C.) and higher average charge-discharge efficiencies during cycling than Comparative Battery Z, which did not contain VC. It is believed that the reason is as follows. When the non-aqueous electrolyte contains VC as in Batteries A1-A7 of the invention, the VC reacts with the positive electrode active material, lithium iron phosphate, at the positive electrode surface and forms a good surface film on the surface of the lithium iron phosphate, preventing dissolution of iron into the electrolyte solution, as will be appreciated from the results shown in Table 1. As a result, deposition of iron ions on the negative electrode can be prevented, and the capacity decrease of the negative electrode is lessened. The reason will be described in more detail in Experiment 2 in the third embodiment below.

Moreover, Batteries A1 and A3-A7 of the invention, in which the content of VC per 1 g of the lithium iron phosphate was 4 mg or greater, exhibited significantly high capacity retention ratios (when charged-discharged at 55° C.) after the 50th cycle and significantly high average charge-discharge efficiencies. The reason is believed to be that in the case that the amount of VC added is less than 4 mg per 1 g of the lithium iron phosphate (in the case of Battery A2 of the invention), the amount of VC added is so small that the entire surface of the positive electrode active material cannot be coated with the good surface film.

It should be noted, however, that it is desirable that the content of VC added be 40 mg or less per 1 g of the lithium iron phosphate. Although not shown in Table 1, when the content of VC added is greater than 40 mg per 1 of lithium iron phosphate, the surface films that cover the positive and negative electrodes become so thick that the resistances in the positive and negative electrodes increase, lowering the load characteristics.

For these reasons, it is most desirable that the content of VC added be from 4 mg to 40 mg per 1 g of the lithium iron phosphate, as in Batteries A1 and A3-A5 of the invention.

Second Embodiment

Examples B1 to B4

Non-aqueous electrolyte secondary batteries were fabricated in the same manner as described in Example 1 of the first embodiment, except that the filling densities of the positive electrode active material-containing layers were 1.5 g/cm³, 1.7 g/cm³, 1.9 g/cm³, and 2.2 g/cm³, respectively. The filling density of the positive electrode active material-containing layer was controlled by varying the pressure in the pressure-rolling using pressure rollers after the positive electrode slurry was applied onto the positive electrode current collector and then dried.

The batteries thus fabricated are hereinafter referred to as Batteries B1 to B4 of the invention, respectively.

Experiment

Batteries B1 to B4 of the invention and the foregoing Battery A1 of the invention were cycled under the following charge-discharge conditions to find the discharge capacity ratio of each battery. The results are shown in Table 2 below. The discharge capacity ratio was calculated using the following equations (18) to (21).

Charge-Discharge Conditions

Charge Conditions

Each of the batteries was charged at 25° C. with a constant current of 120 mA to a battery voltage of 4.0 V.

Discharge Conditions

The batteries were discharged at 25° C. with constant currents of 120 mA, 600 mA, 1200 mA, 1800 mA, and 3000 mA, respectively, to a battery voltage of 2.5 V.

The charge-discharge capacity of each of the batteries was measured during the discharge.

Methods of Calculating Discharge Capacity Ratio

Discharge capacity ratio (%) at 600 mA discharge=
(Discharge capacity during 600 mA discharge/
Discharge capacity during 120 mA discharge)×
100     (18)

Discharge capacity ratio (%) at 1200 mA discharge=
(Discharge capacity during 1200 mA discharge/
Discharge capacity during 120 mA discharge)×
100     (19)

Discharge capacity ratio (%) at 1800 mA discharge=
(Discharge capacity during 1800 mA discharge/
Discharge capacity during 120 mA discharge)×
100     (20)

Discharge capacity ratio (%) at 3000 mA discharge=
(Discharge capacity during 3000 mA discharge/
Discharge capacity during 120 mA discharge)×
100     (21)

TABLE 2

| Battery | Carbon-coating amount of positive electrode active material (mass %) | BET specific surface area of positive electrode active material (m²/g) | Median particle diameter of positive electrode active material (µm) | Amount of VC in electrolyte solution (per 1 g of positive electrode active material) (mg) | Filling density of positive electrode active material-containing layer (g/cm³) | Discharge capacity ratio (%) | | | |
|---|---|---|---|---|---|---|---|---|---|
| | | | | | | 600 mA discharge | 1200 mA discharge | 1800 mA discharge | 3000 mA discharge |
| B1 | 2.2 | 16 | 0.84 | 16 | 1.5 | 45.9 | Non-dischargeable | Non-dischargeable | Non-dischargeable |
| B2 | | | | | 1.7 | 87.0 | 71.1 | 2.8 | Non-dischargeable |
| B3 | | | | | 1.9 | 91.8 | 87.5 | 84.7 | 78.6 |
| A1 | | | | | 2.0 | 95.4 | 90.2 | 86.8 | 81.3 |
| B4 | | | | | 2.2 | 98.0 | 94.7 | 92.5 | 88.1 |

As clearly seen from Table 2 above, Battery B1 of the invention, in which the positive electrode active material-containing layer has a filling density of less than 1.7 g/cm³, is unable to discharge when the current value is 1200 mA or greater. Battery B2 of the invention, in which the positive electrode active material-containing layer has a filling density of 1.7 g/cm³, is unable to discharge when the current value is 3000 mA and shows a considerably low discharge capacity ratio when the current value is 1800 mA. Battery B3 of the invention, in which the positive electrode active material-containing layer has a filling density of 1.9 g/cm³, shows a low discharge capacity ratio of 78.6 when the current value is 3000 mA. In contrast, Batteries A1 and B4 of the invention, in which the positive electrode active material-containing layer has a filling density of 2.0 g/cm³ or greater, exhibit high discharge capacity ratios at all the current values. Accordingly, it is preferable that the positive electrode active material-containing layer has a filling density of 1.7 g/cm³ or greater, and more preferably 2.0 g/cm³ or greater.

The results are believed to be due to the fact that when the positive electrode active material-containing layer has a filling density of less than 2.0 g/cm³ (particularly when less than 1.7 g/cm³), the energy density of the positive electrode is poor, and at the same time, the adhesion of the positive electrode active material to the conductive agent and to the positive electrode current collector is poor, making the electronic conductivity within the positive electrode insufficient.

Although the upper limit of the filling density of the positive electrode active material-containing layer is not shown in the foregoing experiment, it is preferable that the positive electrode active material-containing layer have a filing density of 3.15 g/cm³ or less, more preferably 2.7 g/cm³ or less, and still more preferably 2.3 g/cm³ or less. The reason is that when the filling density of the positive electrode active material-containing layer is greater than the values specified above, the space within the positive electrode that accommodates the electrolyte solution is so narrow that a sufficient amount of the electrolyte solution cannot be impregnated therein, and the discharge capacity of the battery becomes poor.

Third Embodiment

Example C

A non-aqueous electrolyte secondary battery was fabricated in the same manner as described in Example 1 of the first embodiment, except that the positive electrode active material had a carbon-coating amount of 2.0 mass %, a BET specific surface area of 16 m$^2$/g, and a median particle diameter of 0.76 μm.

The battery thus fabricated is hereinafter referred to as Battery C of the invention.

Comparative Example Y

A non-aqueous electrolyte secondary battery was fabricated in the same manner as described in Example C above, except that no VC was added to the electrolyte solution.

The battery thus fabricated is hereinafter referred to as Comparative Battery Y

Experiment 1

Battery C of the invention and Comparative Battery Y as described above were cycled under the same conditions as shown in Experiment of the first embodiment to find the high-temperature cycle performance of each battery. The results are shown in Table 3 below. The evaluation items in the high-temperature cycle performance test, the methods of calculating the evaluation items, and the methods of the measurements were the same as those described in the first embodiment.

TABLE 3

| Battery | Carbon-coating amount of positive electrode active material (mass %) | BET specific surface area of positive electrode active material (m$^2$/g) | Median particle diameter of positive electrode active material (μm) | Filling density of positive electrode active material-containing layer (g/cm$^3$) | Amount of VC in electrolyte solution (per 1 g of positive electrode active material) (mg) | Capacity retention ratio after the 50th cycle (%) | Average charge-discharge efficiency during cycling (%) |
|---|---|---|---|---|---|---|---|
| C | 2.0 | 16 | 0.76 | 2.0 | 16 | 94.8 | 99.70 |
| Y | | | | | 0 | 4.6 | 93.90 |

As clearly seen from Table 3 above, Battery C of the invention, which contained VC, showed a higher capacity retention ratio after the 50th cycle (when charged-discharged at 55° C.) and a higher average charge-discharge efficiency during cycling cycle than Comparative Battery Y, which did not contain VC. It is believed that this is due to the same reason as discussed in Experiment in the first embodiment.

Experiment 2

Battery C of the invention and Comparative Battery Y were cycled 10 times under the same conditions as shown in Experiment of the first embodiment. Thereafter, each battery was disassembled to take out the electrolyte solution and the negative electrode active material-containing layer. The electrolyte solutions and the negative electrode active material-containing layers thus obtained were analyzed with an ICP emission spectroscope, to determine the amount of Fe contained in the electrolyte solutions and the negative electrode active material-containing layers. The results are shown in Table 4 below.

TABLE 4

| Battery | Amount of VC in electrolyte solution (per 1 g of positive electrode active material) (mg) | Amount of Fe contained per 1 g of electrolyte solution after cycled 10 times at high temperature (μg) | Amount of Fe contained per 1 g of negative electrode active material-containing layer after cycled 10 times at high temperature (μg) |
|---|---|---|---|
| C | 16 | 7.5 | 7.1 |
| Y | 0 | 5.9 | 229 |

Battery C of the invention, which contained VC, and Comparative Battery Y, which did not contain VC, were compared for the amount of Fe contained in the electrolyte solution. As clearly seen from Table 4 above, both batteries showed little difference in the amount of Fe contained in the electrolyte solution after cycled 10 times at a high temperature. However, Comparative Battery Y contained a substantially greater amount of Fe in the negative electrode active material-containing layer cycled 10 times at a high temperature than Battery C of the invention. It should be noted that both the negative electrode and the electrolyte solution contained almost no Fe before the charge-discharge cycling.

For the reasons stated above, it is believed that the Fe that is present in the negative electrode derives from the dissolution of Fe from the positive electrode, and that the addition of VC to the electrolyte solution allows the VC to react with the positive electrode, preventing the dissolution of Fe from the positive electrode. The addition of VC to the electrolyte solution prevents side reactions originating from the deposition of Fe on the negative electrode and thus improves the cycle performance of the battery at high temperature.

Fourth Embodiment

Example D

A non-aqueous electrolyte secondary battery was fabricated in the same manner as described in Example 1 of the first embodiment, except that the positive electrode active material had a carbon-coating amount of 1.2 mass %, a BET specific surface area of 18 m$^2$/g, and a median particle diameter of 3.5 μm, and that the positive electrode active material-containing layer had a filling density of 2.2 μm/cm$^3$.

The battery thus fabricated is hereinafter referred to as Battery D of the invention.

Comparative Example X

A non-aqueous electrolyte secondary battery was fabricated in the same manner as described in Example D above, except that no VC was added to the electrolyte solution.

The battery thus fabricated is hereinafter referred to as Comparative Battery X.

Experiment

Battery D of the invention and Comparative Battery X as described above were cycled under the same conditions as shown in Experiment of the first embodiment to find the high-temperature cycle performance of each battery. The results are shown in Table 5 below. The evaluation items in the high-temperature cycle performance test, the methods of calculating the evaluation items, and the methods of the measurements were the same as those described in the first embodiment.

eter of 4.0 µm, and that the positive electrode active material-containing layer had a filling density of 1.9 µm/cm$^3$.

The battery thus fabricated is hereinafter referred to as Battery E of the invention.

Comparative Example W

A non-aqueous electrolyte secondary battery was fabricated in the same manner as described in Example E above, except that no VC was added to the electrolyte solution.

The battery thus fabricated is hereinafter referred to as Comparative Battery W.

Experiment

Battery E of the invention and Comparative Battery W as described above were cycled under the same conditions as

TABLE 5

| Battery | Carbon-coating amount of positive electrode active material (mass %) | BET specific surface area of positive electrode active material (m$^2$/g) | Median particle diameter of positive electrode active material (µm) | Filling density of positive electrode active material-containing layer (g/cm$^3$) | Amount of VC in electrolyte solution (per 1 g of positive electrode active material) (mg) | Capacity retention ratio after the 50th cycle (%) | Average charge-discharge efficiency during cycling (%) |
|---|---|---|---|---|---|---|---|
| D | 1.2 | 18 | 3.5 | 2.2 | 16 | 96.8 | 99.88 |
| X | | | | | 0 | 82.4 | 99.37 |

As clearly seen from Table 5 above, Battery D of the invention, which contained VC, showed a higher capacity retention ratio after the 50th cycle (when charged-discharged at 55° C.) and a higher average charge-discharge efficiency during cycling cycle than Comparative Battery X, which did not contain VC. It is believed that this is due to the same reason as discussed in Experiment in the first embodiment.

shown in Experiment of the first embodiment to find the high-temperature cycle performance of each battery. The results are shown in Table 6 below. The evaluation items in the high-temperature cycle performance test, the methods of calculating the evaluation items, and the methods of the measurements were the same as those described in the first embodiment.

TABLE 6

| Battery | Carbon-coating amount of positive electrode active material (mass %) | BET specific surface area of positive electrode active material (m$^2$/g) | Median particle diameter of positive electrode active material (µm) | Filling density of positive electrode active material-containing layer (g/cm$^3$) | Amount of VC in electrolyte solution (per 1 g of positive electrode active material) (mg) | Capacity retention ratio after the 50th cycle (%) | Average charge-discharge efficiency during cycling (%) |
|---|---|---|---|---|---|---|---|
| E | 1.2 | 18 | 3.5 | 2.2 | 16 | 93.7 | 99.70 |
| W | | | | | 0 | 74.2 | 98.25 |

Fifth Embodiment

Example E

A non-aqueous electrolyte secondary battery was fabricated in the same manner as described in Example 1 of the first embodiment, except that the positive electrode active material had a carbon-coating amount of 5.0 mass %, a BET specific surface area of 13 m$^2$/g, and a median particle diam- As clearly seen from Table 6 above, Battery E of the invention, which contained VC, showed a higher capacity retention ratio after the 50th cycle (when charged-discharged at 55° C.) and a higher average charge-discharge efficiency during cycling cycle than Comparative Battery W, which did not contain VC. It is believed that this is due to the same reason as discussed in Experiment in the first embodiment.

As clearly shown in the fourth and fifth embodiments, the configuration according to the present invention achieves excellent cycle performance at high temperature even when carbon-coating amount, BET specific surface area, median diameter, filling density of the positive electrode active material-containing layer, and so forth are varied.

OTHER EMBODIMENTS

Although VC is used as an additive to the non-aqueous electrolyte in the foregoing examples, this is not intended to be limiting of the present invention. For example, it is of course possible to employ a derivative of VC, or a mixture of VC and a derivative thereof.

The present invention is applicable to, for example, driving power sources for mobile information terminals such as mobile telephones, notebook computers, and PDAs.

Only selected embodiments have been chosen to illustrate the present invention. To those skilled in the art, however, it will be apparent from the foregoing disclosure that various changes and modifications can be made herein without departing from the scope of the invention as defined in the appended claims. Furthermore, the foregoing description of the embodiments according to the present invention is provided for illustration only, and not for limiting the invention as defined by the appended claims and their equivalents.

What is claimed is:

1. A non-aqueous electrolyte secondary battery comprising:
    a positive electrode having a positive electrode current collector and a positive electrode active material-containing layer formed on a surface of the positive electrode current collector, the positive electrode active material-containing layer containing a conductive agent and a positive electrode active material including lithium iron phosphate;
    a negative electrode containing a carbon material; and
    a non-aqueous electrolyte containing vinylene carbonate and/or a derivative thereof in an amount of from 16 mg to 40 mg per 1 g of the lithium iron phosphate,
    wherein the lithium iron phosphate is superficially coated with carbon, and the amount of the carbon is from 0.5 mass % to 2.2 mass % with respect to the amount of the lithium iron phosphate.

2. The non-aqueous electrolyte secondary battery according to claim 1, wherein the positive electrode active material-containing layer has a filling density of 1.7 g/cm$^3$ or greater.

3. The non-aqueous electrolyte secondary battery according to claim 2, wherein the positive electrode active material-containing layer has a filling density of 3.15 g/cm$^3$ or less.

4. The non-aqueous electrolyte secondary battery according to claim 1, wherein the lithium iron phosphate has a median particle diameter of 3.5 μm or less, as determined by a laser diffraction particle size analyzer.

5. The non-aqueous electrolyte secondary battery according to claim 1, wherein the lithium iron phosphate has a BET specific surface area of 10 m$^2$/g or greater.

* * * * *